UNITED STATES PATENT OFFICE.

HENRY J. BIRD, OF HOBOKEN, NEW JERSEY.

METHOD OF DISINTEGRATING VEGETABLE SUBSTANCES.

SPECIFICATION forming part of Letters Patent No. 482,537, dated September 13, 1892.

Application filed September 11, 1891. Serial No. 405,427. (No specimens.)

*To all whom it may concern:*

Be it known that I, HENRY J. BIRD, a citizen of the United States, residing at Hoboken, in the county of Hudson and State of New Jersey, have invented an Improvement in Methods of Disintegrating Vegetable Substances, of which the following is a specification.

The contents of the paunches in slaughtered animals have heretofore been useless, because the grass, hay, and similar materials are not in a condition adapted to use as a manure or fertilizer, and where animals are slaughtered on an extensive scale difficulty has arisen in disposing of the contents of the paunches and considerable expense has been involved in so doing. By my present invention such contents are rendered valuable and the expense connected with their disposal prevented. In an ordinary paunch about two-thirds of the contents are liquid and the remaining third is composed of grass, hay, straw, or similar materials in a softened condition, resulting from the action of the gastric juices; and my invention relates to the treatment of this material in the following manner for the production of paper-stock: The contents of the paunch, including the liquid materials, are emptied into a suitable boiler, together with lime or similar material, and the same are boiled under a pressure of about seventy pounds to the inch, more or less, and in so doing the fibrous materials are disengaged and softened, after which the materials are passed into an ordinary beating or pulping engine for the separation of the fibers and the washing out of the gelatinous and other substances that have been dissolved in the boiling operation.

I have discovered that the presence of the gastric juices in the boiling operation renders it necessary to use but a comparatively small quantity of lime or similar material, and the gastric juices thereby effect a saving in the treatment of the vegetable fiber, and by this improved process any preliminary washing is rendered unnecessary.

I am aware that straw and other vegetable materials have been boiled in the presence of lime, soda, and similar materials for softening the silica and separating the fibers. Hence my present invention does not relate, broadly, to the boiling operation in the presence of an alkali.

By my present invention the gastric juices are made use of in the presence of sufficient heat to cause such gastric juices to act upon the vegetable materials with which they are in contact. Hence I am enabled to utilize the gastric juices from the paunches of slaughtered animals in the disintegrating and digesting of the vegetable fiber. The source from which the gastric juice is derived is the paunches of slaughtered cattle and usually the paunch contains as much vegetable material as the gastric juice is adapted to operate upon, but when that is not the case other vegetable material can be added, so as to utilize all the gastric juice.

I claim as my invention—

1. The method herein specified of disintegrating vegetable substances and separating the fiber for paper-stock, consisting in subjecting such vegetable material to the action of gastric juices in the presence of sufficient heat to render such gastric juices efficient in the disintegration of the material and washing out the other substances for the separation of the fiber, substantially as set forth.

2. The method herein specified of disintegrating vegetable fiber for the production of paper-stock, consisting in subjecting such vegetable fiber to the action of gastric juices and an alkali in the presence of sufficient heat to render such gastric juices efficient and washing the other substances from the fiber, substantially as set forth.

3. The method herein specified for disintegrating and separating the vegetable substances contained in the paunches in slaughtered cattle, consisting in adding thereto an alkali, such as lime, heating the same in a suitable vessel, and subjecting such material to a beating or pulping operation for separating the fibers and washing out the softened materials to obtain paper-stock, substantially as set forth.

Witness my signature this 4th day of September, 1891.

HENRY J. BIRD.

Witnesses:
LOUISE C. HOWARD,
HENRY M. BRISTOL.